US010763523B2

(12) United States Patent
Jahnke et al.

(10) Patent No.: US 10,763,523 B2
(45) Date of Patent: Sep. 1, 2020

(54) FUEL CELL SYSTEM WITH WASTE HEAT RECOVERY FOR PRODUCTION OF HIGH PRESSURE STEAM

(71) Applicant: FUELCELL ENERGY, INC., Danbury, CT (US)

(72) Inventors: Fred C. Jahnke, Rye, NY (US); Matthew Lambrech, Sherman, CT (US); Pinakin Patel, Danbury, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 128 days.

(21) Appl. No.: 14/550,320

(22) Filed: Nov. 21, 2014

(65) Prior Publication Data
US 2016/0149233 A1 May 26, 2016

(51) Int. Cl.
H01M 8/04 (2016.01)
H01M 8/04014 (2016.01)
H01M 8/04111 (2016.01)
H01M 8/0612 (2016.01)
H01M 8/14 (2006.01)
H01M 8/124 (2016.01)

(52) U.S. Cl.
CPC .... *H01M 8/04014* (2013.01); *H01M 8/04111* (2013.01); *H01M 8/0612* (2013.01); *H01M 8/04022* (2013.01); *H01M 2008/1293* (2013.01); *H01M 2008/147* (2013.01); *H01M 2250/405* (2013.01); *Y02B 90/16* (2013.01); *Y02E 60/526* (2013.01); *Y02P 70/56* (2015.11); *Y02P 90/40* (2015.11)

(58) Field of Classification Search
CPC ........ H01M 8/04074; H01M 8/04014; H01M 8/04126
See application file for complete search history.

(56) References Cited

U.S. PATENT DOCUMENTS

| 5,449,568 | A | * | 9/1995 | Micheli | ............. F02C 1/05 429/434 |
| 6,365,289 | B1 | | 4/2002 | Lee et al. | |
| 6,365,290 | B1 | | 4/2002 | Ghezel-Ayagh et al. | |
| 8,367,256 | B2 | | 2/2013 | Jahnke et al. | |

(Continued)

FOREIGN PATENT DOCUMENTS

| JP | 2010-518559 A | 5/2010 |
| KR | 20110125657 A | 11/2011 |
| WO | WO-2014/167764 | 10/2014 |

OTHER PUBLICATIONS

International Search Report and Written Opinion in PCT/US2015/061545, dated Jan. 27, 2016 (9 pages).

(Continued)

*Primary Examiner* — Cynthia K Walls
(74) *Attorney, Agent, or Firm* — Foley & Lardner LLP

(57) ABSTRACT

A fuel cell system for generating electrical power and high level heat comprising at least one high temperature fuel cell stack having an anode side and a cathode side and adapted to generate electrical power, and a gas oxidizer/high level heat recovery assembly comprising an oxidizer adapted to oxidize one or more of exhaust output from the at least one high temperature fuel cell stack and a gas derived from the exhaust, and to generate high level heat, and a high level heat recovery system adapted to recover the high level heat generated in the oxidizer.

21 Claims, 3 Drawing Sheets

(56) References Cited

U.S. PATENT DOCUMENTS

| | | | |
|---|---|---|---|
| 2002/0055025 A1 | 5/2002 | Lee et al. | |
| 2004/0229102 A1* | 11/2004 | Jahnke | H01M 8/04097 429/410 |
| 2008/0187789 A1* | 8/2008 | Ghezel-Ayagh | F02C 1/007 429/414 |
| 2009/0208784 A1 | 8/2009 | Perry et al. | |
| 2010/0047641 A1* | 2/2010 | Jahnke | H01M 8/04291 429/415 |
| 2010/0062298 A1* | 3/2010 | Valensa | H01M 8/04007 429/425 |
| 2010/0216039 A1 | 8/2010 | Jahnke et al. | |
| 2011/0053027 A1* | 3/2011 | Weingaertner | F28D 9/005 429/440 |
| 2014/0318146 A1* | 10/2014 | Kobayashi | F02C 6/08 60/783 |

OTHER PUBLICATIONS

Extended European Search Report for EP15860537, dated Apr. 18, 2018 (7 pages).
Preliminary rejection of KR Pat. Appl. No. 10-2017-7016986 dated Jul. 20, 2018, with English translation (16 pages).
Communication pursuant to Article 94(3) EPC in EP 15860537.8 dated Mar. 26, 2019 (4 pages).
First Office Action in CN Appl. 2015800631660 dated Mar. 1, 2019, with English translation (17 pages).

* cited by examiner

FUEL CELL SYSTEM WITH WASTE HEAT RECOVERY FOR PRODUCTION OF HIGH PRESSURE STEAM

BACKGROUND OF THE INVENTION

This invention relates to fuel cell systems and, in particular, to fuel cell systems with waste heat recovery for production of high pressure steam.

A fuel cell is a device which directly converts chemical energy stored in hydrocarbon fuel into electrical energy by means of an electrochemical reaction. Generally, a fuel cell comprises an anode electrode and a cathode electrode separated by an electrolyte, which serves to conduct electrically charged ions. High temperature fuel cells, such as molten carbonate fuel cells and solid oxide fuel cells, operate by passing a reactant fuel gas through the anode, while oxidant gas containing oxygen and other gases is passed through the cathode. In order to produce a useful power level, a number of individual fuel cells are stacked in series.

High temperature fuel cells typically operate at temperatures of 600° C. (1100° F.) and 1000° C. (1800° F.), depending on the type of fuel cell, and produce waste heat as part of high temperature exhaust output by the fuel cells. In addition, high temperature fuel cells typically consume 60 to 80% of the fuel fed to the fuel cell system and in conventional systems, the remaining fuel is output with fuel cell exhaust and is oxidized and converted to waste heat in an oxidizer or similar device. In conventional fuel cell systems, waste heat from the fuel cell exhaust is recovered by cooling system exhaust gas from about 398.9° C. (750° F.) to about 121.1° C. (250° F.) after pre-heating incoming fuel in a humidifier/heat exchanger. Water may be recovered from the fuel cell exhaust and the recovered water may be recycled for humidifying incoming fuel. An example of such a system is disclosed in anode exhaust water recovery U.S. Pat. No. 8,367,256, assigned to the same assignee herein.

In conventional systems, the maximum level of heat recoverable from the exhaust is limited to about 371.1° C. (700° F.) and to recover all the heat as steam, the upper temperature limit of the steam produced is about 121.1° C. (250° F.), or steam at a pressure of about 103.4 kPa (15 psig). Production of steam at a pressure higher than about 103.4 kPa (15 psig) will greatly reduce the amount of waste heat recovered. In addition, for industries that use high pressure steam of more than 4136.8 kPa (600 psig), over 70% of the waste heat in fuel cell cathode exhaust is unusable in the conventional system. Moreover, waste heat from fuel cell exhaust is recovered using a heat exchanger with a temperature approach, typically between 10.0° C. (50° F.) and 65.6° C. (150° F.). When the approach temperature is considered in the heat recovery, the amount of heat available is reduced by an additional 5 to 20%.

SUMMARY OF THE INVENTION

It is an object of the present invention to provide a fuel cell system with an improved waste heat recovery that enables production of high pressure steam and/or recovery of high level (>426.7° C. (800° F.) waste heat for other purposes from the fuel cell waste heat.

It is a further object of the present invention to improve the overall efficiency of the fuel cell system by making the system water independent and by eliminating or replacing conventional water preparation components that require power for their operation.

These and other objectives are realized in a fuel cell system for generating electrical power and high pressure high temperature steam and/or recovery of high level (>426.7° C. (800° F.)) waste heat for other purposes comprising at least one high temperature fuel cell stack having an anode side and a cathode side and adapted to generate electrical power; and a gas oxidizer/high level heat recovery assembly comprising an oxidizer adapted to oxidize one or more of exhaust output from the at least one high temperature fuel cell stack and a gas derived from the exhaust, and to generate high level heat, and a high level heat recovery system adapted to recover the high level heat generated in the oxidizer assembly. In some embodiments, the high level heat recovery assembly comprises a boiler adapted to receive feed water and to generate high pressure high temperature steam using the waste heat generated by the oxidizer. In other embodiments, the high level heat recovery system provides high level heat to other high level heat recovery systems which may include one or more of: a fuel reforming assembly, a refinery coker unit, a heavy oil distillation unit and an expander. In certain embodiments, the exhaust is anode exhaust and the oxidizer oxidizes one or more of anode exhaust output from the at least one high temperature fuel cell stack and the gas derived from the anode exhaust.

In some embodiments, the system also includes one or more of: an anode exhaust recuperator adapted to cool the exhaust output from at least one fuel cell stack before the exhaust or the gas derived from the anode exhaust is provided to the oxidizer and to pre-heat input oxidant gas using heat in the anode exhaust before the heated oxidant gas is provided to the oxidizer; and a water transfer assembly adapted to recover water from the exhaust and to output water-separated exhaust where the bulk of the water has been removed from the exhaust gas, wherein the gas derived from the exhaust includes the water-separated exhaust. The exhaust recuperator may be further adapted to pre-heat the water-separated exhaust and to output the heated water-separated exhaust to the oxidizer.

In certain embodiments, the fuel cell system further comprises a heater or heat recuperator adapted to heat the oxidant gas using waste heat from oxidant exhaust output (cathode exhaust) from the at least one high temperature fuel cell stack before the heated oxidant gas is provided to the oxidizer.

In certain embodiments, the fuel cell system may also include a fuel processing assembly for processing input fuel before supplying the processed fuel to at least one high temperature fuel cell stack, and the fuel processing assembly includes a humidifier/heat exchanger assembly adapted to humidify the input fuel using one or more of water and a first portion of the high pressure high temperature steam generated in the boiler and to pre-heat humidified fuel using waste heat from oxidant exhaust output by the at least one high temperature fuel cell stack. The system may also include a water transfer assembly for recovering water from the anode exhaust so as to output recovered water to the humidifier/heat exchanger assembly for humidifying the input fuel and to output water-separated anode exhaust for use in the oxidizer. In some embodiments, the fuel cell system includes an expander assembly for expanding the first portion of the high pressure high temperature steam and outputting lower pressure steam to the humidifier/heat exchanger assembly while generating power from the expansion process. In such embodiments, the power generated by the expander assembly may be output from the system or used within the system. Moreover, the system may include an air blower for supplying oxidant gas to the system, with the air blower being directly coupled with the expander assembly so that the power generated by the expander assembly is directly used by the air blower. In some embodiments, the gas oxidizer/boiler assembly is coupled with the at least one high temperature fuel cell stack so that the gas oxidizer/boiler assembly outputs high temperature oxidant gas to the cathode side of the at least one high temperature fuel cell stack.

A method of generating electrical power and high pressure high temperature steam using a fuel cell system is described. The method comprises the steps of operating at least one high temperature fuel cell stack having an anode side and a cathode side so as to generate electrical power; and oxidizing one or more of anode exhaust output from the at least one high temperature fuel cell stack and/or a gas derived from the anode exhaust in an oxidizer while generating waste heat as a result of the oxidizing process; and generating high pressure high temperature steam from feed water by directly using the waste heat generated in the oxidizing step. Other features described above with respect to the fuel cell system may be incorporated in the method. Other systems requiring high level heat input could be used instead of steam generation.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
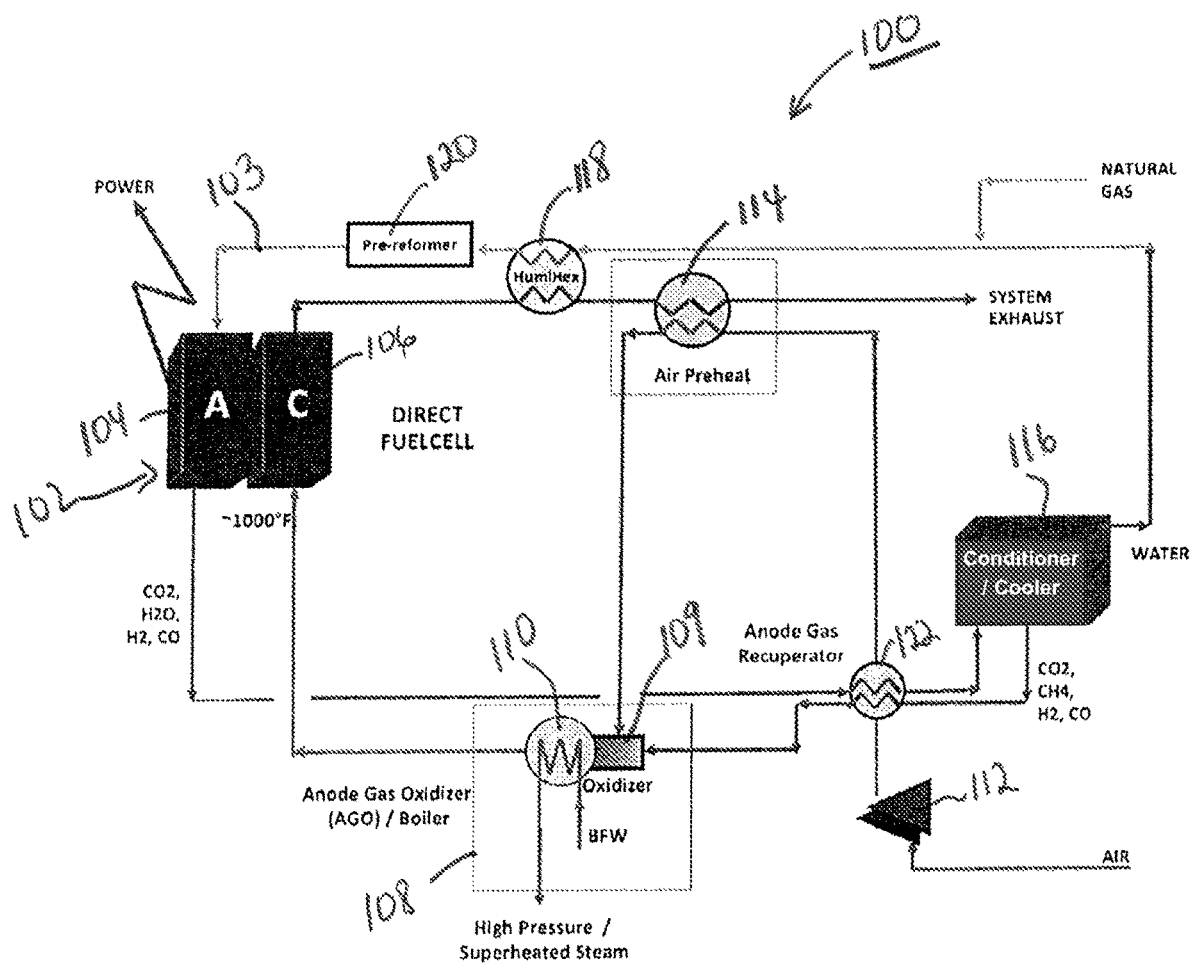
FIG. 1 shows a block diagram of a high pressure steam generation system utilizing fuel cell waste heat in accordance with the present invention, including water recovery.
Figure 2:
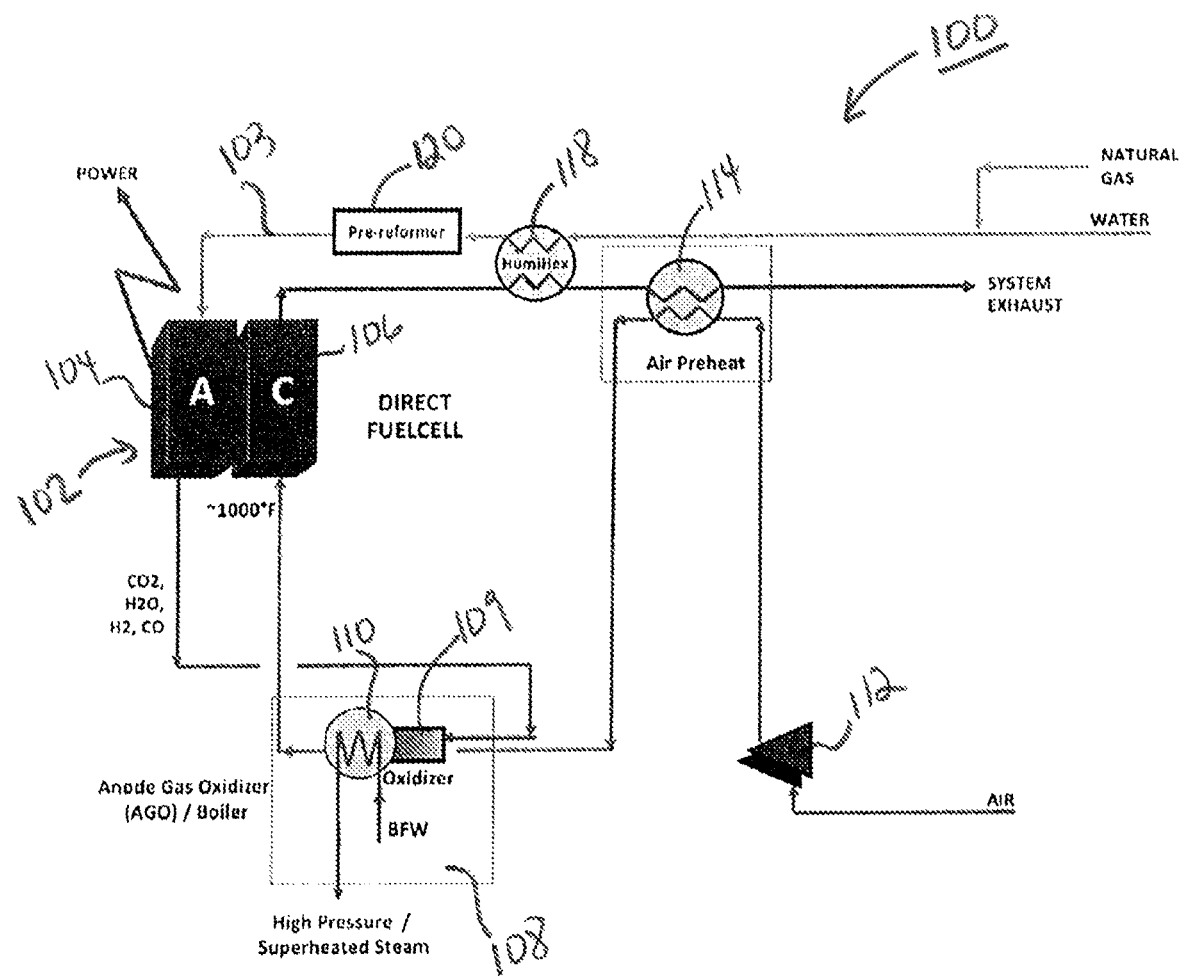
FIG. 2 shows a block diagram of an embodiment of the high pressure steam generation system of FIG. 1, without water recovery.
Figure 3:
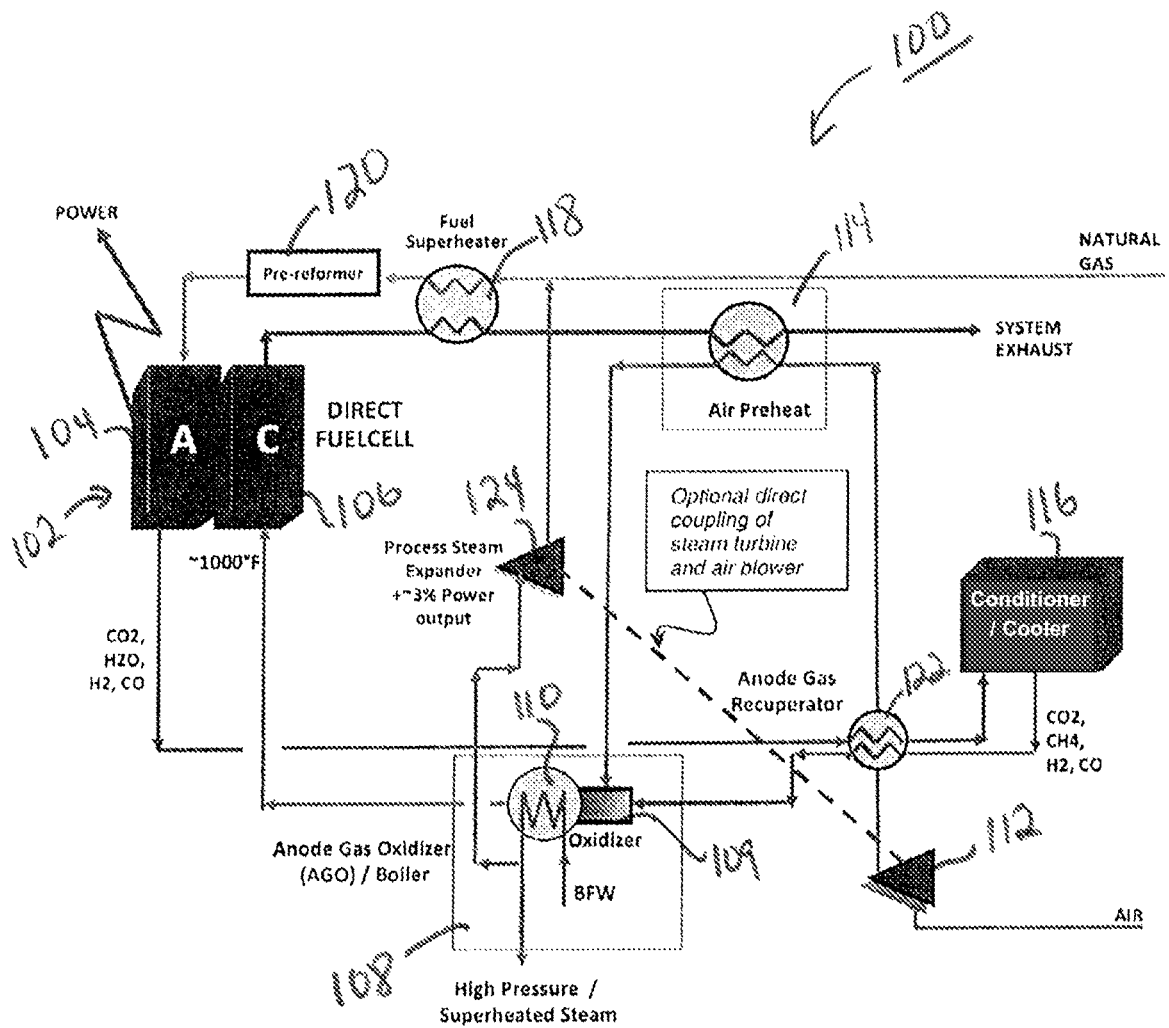
FIG. 3 shows a block diagram of a third embodiment of the high pressure steam generation system of FIG. 1 with power generation from a letdown steam turbine.

FIGS. 1-3 show different embodiments of a high pressure steam generation system 100 that utilizes fuel cell waste heat for production of high pressure high temperature steam. The high pressure steam generation system 100 comprises one or more fuel cell stacks 102, each of which includes an anode side 104, adapted to receive fuel from a fuel supply path 103 and to output anode exhaust, and a cathode side 106 adapted to receive oxidant gas and to output cathode exhaust, and an anode gas oxidizer (AGO)/Boiler assembly 108 adapted to receive fuel cell exhaust, or gas derived from the fuel cell exhaust, air or oxidant gas, and water, and to produce high pressure superheated steam for use outside the system 100 and oxidant gas suitable for use in the fuel cell cathode 106. In the systems shown in FIGS. 1-3, the fuel cell exhaust used in the AGO/Boiler assembly, or the gas derived therefrom, is anode exhaust gas. As shown in FIGS. 1-3, the AGO/Boiler assembly 108 includes an AGO 109, or oxidizer, and an AGO fired boiler 110. The AGO 109 receives anode exhaust, or gas derived from anode exhaust, and air or oxidant gas, and oxidizes the received gases to produce high temperature oxidant gas suitable for use in the fuel cell cathode side 106. As shown in FIGS. 1-3, prior to being supplied to the AGO 109, the air or oxidant gas is conveyed to a heat exchanger 114 using an air blower 112 or similar device, and pre-heated in the heat exchanger 114 using a heated gas or fluid, such as cathode exhaust output from the cathode side 106 of the fuel cell stack 102. The boiler 110 receives boiler feed water, recovers heat from the high temperature oxidant gas output from the AGO 109 at a temperature of about 537.8-1093.3° C. (1000-2000° F.), and uses the heat recovered from the high temperature oxidant gas to produce the high pressure steam which may also be superheated. After heat is recovered from the high temperature oxidant gas in the boiler 110, the high temperature oxidant gas is conveyed to the cathode side 106 of the fuel cell stack 102. The temperature of the oxidant gas received in the cathode side 106 of the stack 102 is about 537.8° C. (1000° F.) for a molten carbonate fuel cell (MCFC) system.

FIG. 1 shows a first embodiment of the high pressure steam generation system 100 which utilizes water recovery from the anode exhaust output from the anode side 104 of the fuel cell stack 102. As shown, the system 100 is supplied with fuel, such as natural gas or other suitable fuel, which is mixed with water from a conditioner/cooler 116, and pre-heated in a humidifier/heat exchanger 118 using waste heat from the fuel cell stack 102. In the illustrative embodiment shown, cathode exhaust output from the cathode side 106 of the stack 102 is conveyed to the humidifier/heat exchanger 118 where waste heat in the cathode exhaust is used to pre-heat the fuel and water mixture. The pre-heated humidified fuel output from the humidifier/heat exchanger 118 is then output to a pre-reformer 120 where the fuel is reformed or partially reformed in the presence of a reforming catalyst. Pre-reformed fuel output from the pre-reformer 120 is then supplied to the anode side 104 of the fuel cell stack 102. Although the humidifier 118 is shown to use heat from the cathode exhaust prior to using this heat for air preheating, part or all of the air preheating using cathode exhaust may be done before part or all of the humidification of the fuel.

In FIG. 1, after undergoing an electrochemical reaction in the fuel cell, anode exhaust is output from the anode side 104 of the fuel cell stack 102. The anode exhaust, which includes unspent fuel, such as hydrogen, carbon monoxide and methane with carbon dioxide and water, is output to an anode gas recuperator 122 which cools the anode exhaust while pre-heating input air or oxidant gas and/or water-separated anode exhaust gas with the bulk of the water removed. Cooled anode exhaust is then conveyed to a water transfer assembly comprising a conditioner/cooler 116 for further cooling the anode exhaust and separating water from the anode exhaust by condensation. It is understood that the configuration of the water transfer assembly may vary depending on the operating conditions of the system, ambient temperature, etc. For example, U.S. Pat. No. 8,367,256, assigned to the applicant herein and incorporated herein by reference, describes a suitable water transfer assembly that can be used for separating water from the anode exhaust. The conditioner/cooler 116 outputs water separated from the anode exhaust, all or a portion of which may be provided for humidifying the fuel, as shown in FIG. 1, and/or may be stored for later use. The conditioner/cooler 116 also outputs water-separated anode exhaust, which includes unspent fuel ($H_2$, $CH_4$), carbon dioxide and carbon monoxide and traces of unrecovered water, and which is conveyed to the anode gas recuperator 122 for heating and thereafter to the AGO/boiler assembly 108. As described above, the AGO 109 of the assembly 108 receives the water-separated anode exhaust and air or oxidant gas, and oxidizes or combusts the unspent fuel in the anode exhaust with the air or oxidant gas. Heat produced in the oxidizer 109 during the oxidizing process is used for heating water in the AGO fired boiler 110 so as to output high pressure/superheated steam. The AGO/boiler assembly 108 also outputs high-temperature oxidizing gas to the cathode side 106 of the fuel cell stack 102.

As shown in FIG. 1, air or other suitable oxidant gas is supplied to the system 100 using the air blower 112 or similar device. The air is pre-heated using waste heat from the fuel cell stack, including low level heat. In the embodiment of FIG. 1, part or all of the air is first pre-heated in the anode gas recuperator 122 using waste heat in the anode exhaust gas and is thereafter heated in the heat exchanger 114 using waste heat in the cathode exhaust. The pre-heated air is then provided to the AGO 109 for a combustion/oxidation reaction with the unspent fuel in the water-separated anode exhaust. The AGO 109 produces very high temperature oxidant gas, with a temperature of 537.8-1093.3° C. (1000-2000° F.), which provides heat to the boiler 110 for generating high pressure/superheated steam from input boiler feed water. As discussed above, the high temperature oxidant gas output from the AGO/boiler assembly 108 is conveyed to the cathode side 106 of the fuel cell stack 102. As shown in FIG. 1 and discussed above, the cathode side of the stack 102 outputs cathode exhaust, which is used in the humidifier/heat exchanger 118 for pre-heating fuel and water mixture so as to produced pre-heated humidified fuel, and in the heat exchanger 114 for pre-heating the compressed air before conveying the air to the AGO/boiler assembly 108.

FIG. 2 shows another embodiment of the high pressure steam generation system 100 which has a simplified arrangement and does not include water recovery. The components used in the system 100 of FIG. 2 are substantially the same as described above and are labeled using the same reference numbers as in FIG. 1. In the system 100 of FIG. 2, input fuel and water are conveyed to the humidifier/heat exchanger 118, which uses waste heat from the cathode exhaust to generate heated humidified fuel. The heated humidified fuel output from the humidifier/heat exchanger 118 is output to the pre-reformer 120 to reform or partially reform the fuel and to output reformed or partially reformed fuel to the fuel cell anode side 104. In FIG. 2, anode exhaust output from the anode side 104 of the fuel cell stack 102 is conveyed to the AGO/boiler assembly 108, which produces high temperature oxidant gas in the AGO 109 and recovers high level heat from the high temperature oxidant gas in the boiler 110 for generating high pressure steam and for superheating the steam. The high temperature oxidant gas output from the AGO/boiler assembly 108 is provided to the cathode side 106 of the stack.

As shown in FIG. 2, cathode exhaust output from the cathode side of the stack is provided to the humidifier/heat exchanger 118 which recovers heat from the cathode exhaust and then to the heat exchanger 114 for pre-heating the incoming air or oxidant gas. As also shown in FIG. 2 and described above, the air or oxidant gas input into the system is supplied using the air blower 112 or the like, to the heat exchanger 114 where it is pre-heated, and thereafter, pre-heated air is provided to the AGO/boiler assembly 108.

FIG. 3 shows the high pressure steam generation system 100 which includes further efficiencies by using a portion of the high pressure high temperature steam generated by the AGO/boiler assembly 108 in the system 100 in addition to exporting the high pressure/superheated steam from the system 100. The system in FIG. 3 includes all of the components described above with respect to FIG. 1 which are arranged in substantially the same arrangement as in FIG. 1. As shown in FIG. 3, anode exhaust output from the anode side 104 of the stack 102 is cooled in the anode gas recuperator 122 and thereafter further cooled in the conditioner/cooler 116 where water is separated from the anode exhaust by condensation. The conditioner/cooler 116 in this embodiment outputs water-separated anode exhaust. Although not shown in FIG. 3, some or all of the water separated in the conditioner/cooler 116 may be output for partially humidifying the input fuel, for use as boiler feed water, or may be collected for later use in the system or outside the system 100. Full humidification of the input fuel is accomplished by mixing the low-pressure exhaust steam from the steam turbine with the feed to fuel gas.

The system 100 of FIG. 3 also includes a process steam expander 124, comprising a steam turbine or the like, which receives a first predetermined portion of the high pressure/superheated steam generated in the AGO/boiler assembly 108 and expands the first predetermined portion of the steam to produce a lower pressure steam. In certain embodiments, the first predetermined portion of the high pressure/superheated steam is produced by the AGO/boiler assembly 108 for humidifying the fuel. As shown, the remaining, second portion of the high pressure/superheated steam is output from the AGO/boiler assembly 108 for export from the system 100. Optionally, all of the steam may be used to produce power in the steam turbine with a condenser. In this case, a portion of steam needed for fuel humidification is extracted from the steam expander 124 at the pressure needed for injection into the fuel stream.

In FIG. 3, the lower pressure steam output from the expander 124 is mixed with input fuel and the mixture of fuel and steam is supplied to the humidifier/heat exchanger 118 to superheat the fuel. The expansion process in the expander 124 generates additional power which is output from the system 100 and/or used by component(s) of the system 100. In some illustrative embodiments, some or all of the power generated by the expander 124 is provided for operation of the air blower 112. In certain embodiments, the power from the process gas expander 124 is directly used by the air blower 112 through a direct coupling of the expander and the air blower 112. In this way, a separate generator for operating the air blower can be eliminated. Moreover, since no condenser system is needed in the system when the low pressure exhaust is fed to the process, the expansion process in the expander 124 boosts the net power generated by the system by about 3% at very low $/kW cost. In addition, use of the lower pressure steam output from the expander 124 to humidify the fuel results in elimination of heat removed by water vaporization in the humidifier/heat exchanger 118, thus further increasing the amount of high pressure steam generated by the AGO/boiler assembly 108 by allowing preheating of the air to a higher level.

In the systems 100 shown in FIGS. 1-3, the waste heat produced by the system is captured at a very high level, with temperatures of 537.8-1093.3° C. (1000-2000° F.), and thus, the high level heat can be used to generate high pressure steam and to superheat the steam. Low level waste heat is captured by air preheat, converting the low level heat to high level heat in the oxidizer. In the system of the present invention, the high level heat is captured at the fuel cell cathode inlet, and specifically, following the oxidizing reaction in the AGO which produces very high temperature oxidant gas. In addition, the waste heat in the cathode exhaust is used to preheat the air supplied to the AGO. In this way, the lower level waste heat in the cathode exhaust is captured by pre-heating the air before it is supplied to the AGO 109, increasing the amount of high level heat available in the boiler 110. The capture of the high level heat at the fuel cell cathode inlet and the increase in the amount of high level heat produced by the AGO allow for practical and efficient production of high pressure steam and for superheating of the steam.

Electrical efficiencies of the embodiments of the system 100 shown in FIGS. 1-3 were calculated and compared with the electrical efficiency of a conventional fuel cell system which recovers waste heat from cathode exhaust output from the fuel cell stack and which oxidizes anode exhaust with air to provide hot oxidant gas to the cathode side of the stack. The electrical efficiency was calculated using the following equation:

$$\text{Efficiency} = \frac{\text{power exported}}{(\text{fuel input} - \text{fuel saved in boiler fuel})} \quad (1)$$

Table 1 below summarizes the electrical efficiencies of the three embodiments of the system of FIGS. 1-3 compared to that of the conventional fuel cell system:

TABLE 1

| System | Electrical Efficiency allowing for fuel reduction in boiler | Combined Heat and Power (CHP) efficiency (including low level heat) |
|---|---|---|
| Conventional system with waste heat recovery from cathode side | 47.0% | 76.6% |
| Base HP Steam System (FIG. 1) | 63.3% | 76.5% |
| Simplified HP Steam System (FIG. 2) | 63.3% | 76.5% |
| Enhanced HP Steam System (FIG. 3) | 63.9% | 81.4% |

The above efficiencies do not include additional benefits of higher efficiencies in boilers which are turned down or the use of lower level heat, such as cathode exhaust heat, to preheat the boiler feed water before it is provided to the AGO fired boiler 110. The results of the table assume that the steam generation allows a corresponding reduction in fuel usage in a typical steam boiler with 85% heat recovery efficiency.

As can be seen from Table 1, the electrical efficiency of the fuel cell system shown in FIGS. 1-3 is increased to over 62%, as compared to 47% electrical efficiency of the conventional systems. These improved efficiencies are realized by turning down or turning off existing steam generation boilers and lowering net fuel use. Moreover, overall efficiencies that are greater than 80% are possible in combined heat and power (CHP) operations, particularly if low level heat is also used for the boiler heating requirements. As discussed above with respect to FIGS. 1-3, the heat exchanger 114 uses low level heat from the cathode exhaust to further pre-heat the air before it is provided to the oxidizer. Thus, the amount of low level heat available for recovery by boiler feed water preheating is much lower than in a typical boiler and recovery of heat from other sources in an industrial site for boiler feed water heating is feasible. This recovery would thereby further increase the efficiency of the whole system.

Moreover, the fuel cell systems of the present invention provide for reduced emissions, particularly combustion emissions, and provide for distributed generation of electric power and high pressure, high temperature steam. Specifically, fuel cell system emissions and noise are near zero, and the systems shown in FIGS. 1-3 reduce or eliminate the need for conventional heating sources used for steam generation, such as combustion heating and the like. For example, when the systems of FIGS. 1-3 are run with biogas fuel, the net greenhouse $CO_2$ emissions are zero, and when these systems are run on natural gas fuel, the greenhouse gas emissions are reduced substantially compared to conventional power and steam generation systems due to the high efficiency of the system. As a result, the systems of FIGS. 1-3 provide for near demand steam generation with near zero or substantially reduced system emissions and noise, even in densely populated or non-attainment areas.

The systems of FIGS. 1-3 also minimize transmission losses and can alleviate grid congestion. Specifically, the systems of FIGS. 1-3 not only generate electrical power but also reduce the power required for generating the high pressure high temperature steam. In addition, solid state power conditioning units can improve local power quality by compensating for grid variations.

The systems of FIGS. 1-3 are highly reliable, incorporating DFC® fuel cells which have been commercially operated for over 10 years. In addition, the systems of FIGS. 1-3 are operable using a variety of fuels, including renewable fuels, and are water independent, having net zero water balance. In particular, commercial DFC® fuel cell stacks can operate using renewable anaerobic digester gas (ADG) fuel which is generated from renewable biomass (waste water), and there is no performance loss due to the use of the ADG fuel. The systems of FIGS. 1-3, and particularly the systems shown in FIGS. 1 and 3, can include water transfer assemblies for recovering water from fuel cell exhaust so that the system requires no make-up water and can potentially export some of the water produced from the oxidation of the fuel. Other benefits and advantages not mentioned above may be realized by the systems of the present invention.

The specific embodiments described above with respect to FIGS. 1-3 use an AGO/Boiler assembly as an AGO/high level heat recovery assembly, and the assembly includes the AGO fired boiler. However, it is also contemplated that other high level heat recovery systems may be used in place of the AGO fired boiler in the AGO/high level recovery assembly. In such cases, the AGO operates as described above to oxidize anode exhaust or gas derived from anode exhaust and to generate high level heat. The high level heat recovery system then recovers the high level heat generated in the AGO and uses the recovered high level heat for one or more processes requiring heating. Such processes include, but are not limited to, fuel reforming processes, such as natural gas reforming, heating feed to a refinery coker unit or a heavy oil distillation unit, and heating gas, such as air, being fed to an expander.

In sum, the present invention is directed to a fuel cell system for efficiently generating electrical power and high pressure high temperature steam and to the method of generating electrical power and high pressure high temperature steam using a fuel cell system. The fuel cell system of the present invention includes one or more of the following features:

1. A fuel cell system for generating electrical power and high level heat comprising: at least one high temperature fuel cell stack having an anode side and a cathode side and adapted to generate electrical power; and a gas oxidizer/high level heat recovery assembly comprising an oxidizer adapted to oxidize one or more of exhaust output from the at least one high temperature fuel cell stack or a gas derived from the exhaust, and to generate high level heat, and a high level heat recovery system adapted to recover the high level heat generated in the oxidizer.
2. The fuel cell system in accordance with point 1, wherein the high level heat recovery system comprises a boiler adapted to receive feed water and to generate high pressure high temperature steam using the high level heat generated by the oxidizer.
3. The fuel cell system in accordance with any of the preceding points, wherein the exhaust is anode exhaust and the oxidizer oxidizes one or more of anode exhaust output from the at least one high temperature fuel cell stack and the gas derived from the anode exhaust.
4. The fuel cell system in accordance with any of the preceding points, further comprising one or more of: an exhaust recuperator adapted to cool the exhaust output from the at least one fuel cell stack before the exhaust or the gas derived from the exhaust is provided to the oxidizer and to pre-heat input oxidant gas using heat in the exhaust before the heated oxidant gas is provided to the oxidizer; and a water transfer assembly adapted to recover water from the exhaust and to output water-separated exhaust, wherein the gas derived from the exhaust includes the water-separated exhaust.
5. The fuel cell system in accordance with any of the preceding points, wherein the system comprises the exhaust recuperator and the water transfer assembly and wherein the exhaust recuperator is further adapted to pre-heat the water-separated exhaust and to output the heated water-separated exhaust to the oxidizer.
6. The fuel cell system in accordance with any of the preceding points, further comprising a heater adapted to further heat the pre-heated oxidant gas using waste heat from oxidant exhaust output from the at least one high temperature fuel cell stack before the heated oxidant gas is provided to the oxidizer.
7. The fuel cell system in accordance with any of the preceding points, further comprising a fuel processing assembly for processing input fuel before supplying the processed fuel to the at least one high temperature fuel cell stack, the fuel processing assembly including a humidifier/heat exchanger assembly adapted to humidify the input fuel using one or more of water and a first portion of the high pressure high temperature steam generated in the boiler and to pre-heat humidified fuel using waste heat from oxidant exhaust output by the at least one high temperature fuel cell stack.
8. The fuel cell system in accordance with any of the preceding points, wherein the system further comprises a water transfer assembly adapted to recover water from the anode exhaust and to output recovered water to the humidifier/heat exchanger assembly for humidifying the input fuel and to output water-separated anode exhaust for use in the oxidizer.
9. The fuel cell system in accordance with any of the preceding points, further comprising an expander assembly adapted to expand the first portion of the high pressure high temperature steam and to output lower pressure steam to the humidifier/heat exchanger assembly while generating power from the expansion process, wherein the power generated by the expander assembly is output from the system or used by within the system.
10. The fuel cell system in accordance with any of the preceding points, further comprising an air blower for supplying oxidant gas to the system, wherein the air blower is directly coupled with the expander assembly so that the power generated by the expander assembly is directly used by the air blower.
11. The fuel cell system in accordance with any of the preceding points, wherein the gas oxidizer/boiler assembly is coupled with the at least one high temperature fuel cell stack so that the gas oxidizer/boiler assembly outputs high temperature oxidant gas to the cathode side of the at least one high temperature fuel cell stack.
12. The fuel cell system in accordance with any of the preceding points, wherein the high level heat recovery system provides high level heat to one or more of: a fuel reforming assembly, a refinery coker unit, a heavy oil distillation and an expander.

The method of the present invention includes one or more of the following features:
1. A method of generating electrical power and high level heat using a fuel cell system comprising the steps of: operating at least one high temperature fuel cell stack having an anode side and a cathode side so as to generate electrical power; and oxidizing one or more of exhaust output from the at least one high temperature fuel cell stack and a gas derived from the exhaust in an oxidizer while generating high level heat as a result of the oxidizing process; and recovering the high level heat generated as a result of the oxidizing process.
2. The method in accordance with point 1 wherein the step of recovering high level heat comprises generating high pressure high temperature steam from feed water by directly using the high level heat generated in the oxidizing step.
3. The method in accordance with any of the preceding points, wherein the exhaust is anode exhaust and the oxidizing step comprises oxidizing one or more of anode exhaust output from the at least one high temperature fuel cell stack and the gas derived from the anode exhaust.
4. The method in accordance with any of the preceding points, further comprising one or more of: cooling the exhaust output from the at least one fuel cell stack before the exhaust or the gas derived from the exhaust is oxidized in the oxidizer step, pre-heating input oxidant gas using at least heat in the exhaust and providing the heated oxidant gas for use in the oxidizing step; and recovering water from the exhaust to output water-separated exhaust, wherein the gas derived from the exhaust includes the water-separated exhaust.
5. The method in accordance with any of the preceding points, further comprising pre-heating the water-separated exhaust using the heat in the exhaust while pre-heating the input oxidant gas using the heat in the exhaust, and providing the heated water-separated exhaust for use in the oxidizing step.
6. The method of in accordance with any of the preceding points, further comprising further heating the pre-heated oxidant gas using waste heat from oxidant exhaust output from the at least one high temperature fuel cell stack before the heated oxidant gas is provided for use in the oxidizing step.
7. The method in accordance with any of the preceding points, further comprising processing input fuel before supplying processed fuel to the at least one high temperature fuel cell stack, the processing step including humidifying the input fuel using one or more of water and a first portion of the high pressure high temperature steam generated in the generating step and pre-heating humidified fuel using waste heat from oxidant exhaust output by the at least one high temperature fuel cell stack.

8. The method in accordance with any of the preceding points, further comprising recovering water from the anode exhaust, outputting recovered water for humidifying the input fuel in the processing step and outputting water-separated exhaust for use in the oxidizing step.

9. The method in accordance with any of the preceding points, further comprising expanding a first portion of the high pressure high temperature steam generated in the generating step and outputting lower pressure steam for humidifying the input fuel in the processing step while generating power from the expansion process, wherein the power generated in the expanding step from the expansion process is output for external use or for use within the fuel cell system.

10. The method in accordance with any of the preceding points, further comprising supplying oxidant gas to the system using a blower, and providing the power generated in the expanding step from the expansion process for direct use by the blower via a direct coupling with the blower.

11. The method in accordance with any of the preceding points, wherein the oxidizing step produces a high temperature oxidizing gas and wherein the high temperature oxidant gas is provided to the cathode side of the at least one high temperature fuel cell after using the high level heat in the high temperature oxidant gas in the recovering step.

12. The method in accordance with any of the preceding points, wherein the high temperature oxidant gas produced in the oxidizing step has a temperature of 537.8-1093.3° C. (1000-2000° F.) before the high level heat in the high temperature oxidant gas is used in the recovering step, and the high temperature oxidant gas provided to the cathode side of the at least one high temperature fuel cell has a temperature of about 537.8° C. (1000° F.).

13. The method in accordance with any of the preceding points, wherein the recovering step further comprises providing the high level heat to one or more of: a fuel reforming assembly, a refinery coker unit, a heavy oil distillation unit and an expander.

Additional features described herein above may be included in the fuel cell system or in the method of generating electrical power and high pressure high temperature steam using the fuel cell system.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel cell system for generating electrical power and high level heat comprising:
    at least one high temperature fuel cell stack having an anode side and a cathode side and configured to generate electrical power;
    an exhaust recuperator configured to cool anode exhaust output from the anode side of the at least one fuel cell stack, and to pre-heat an input oxidant gas using heat in the anode exhaust;
    a heat exchanger configured to receive the pre-heated input oxidant gas from the exhaust recuperator and to receive cathode exhaust from the cathode side of the at least one high temperature fuel cell stack, and further pre-heat the input oxidant gas using heat in the cathode exhaust output from the cathode side of the at least one high temperature fuel cell stack; and
    an anode gas oxidizer/high level heat recovery assembly comprising:
        an anode gas oxidizer configured to oxidize anode gas received from the exhaust recuperator using the input oxidant gas that was pre-heated by both the exhaust recuperator and the heat exchanger, and to output high temperature oxidant gas at a temperature in a range of 537.8 to 1093.3° C. (1000 to 2000° F.), and
        a high level heat recovery system configured to receive the high temperature oxidant gas from the anode gas oxidizer, to recover high level heat from the high temperature oxidant gas, and to output high temperature oxidant gas to the cathode side of the at least one high temperature fuel cell stack.

2. The fuel cell system in accordance with claim 1, wherein the high level heat recovery system comprises a boiler configured to receive feed water and to generate high pressure high temperature steam using the high level heat generated by the anode gas oxidizer.

3. The fuel cell system in accordance with claim 1, further comprising:
    a conditioner/cooler configured to recover water from the anode exhaust and to output water-separated anode exhaust, wherein the gas derived from the anode exhaust includes the water-separated anode exhaust.

4. The fuel cell system in accordance with claim 3, wherein the exhaust recuperator is further configured to pre-heat the water-separated anode exhaust and to output the heated water-separated anode exhaust to the anode gas oxidizer.

5. The fuel cell system in accordance with claim 2, further comprising a fuel processing assembly for processing input fuel before supplying the processed fuel to the at least one high temperature fuel cell stack, the fuel processing assembly including a humidifier/heat exchanger assembly configured to humidify the input fuel using one or more of water and a first portion of the high pressure high temperature steam generated in the boiler and to pre-heat humidified fuel using waste heat from oxidant exhaust output by the at least one high temperature fuel cell stack.

6. The fuel cell system in accordance with claim 5, further comprising a conditioner/cooler configured to recover water from the anode exhaust and to output recovered water to the humidifier/heat exchanger assembly for humidifying the input fuel and to output water-separated anode exhaust for use in the anode gas oxidizer.

7. The fuel cell system in accordance with claim 5, further comprising an expander assembly configured to expand the first portion of the high pressure high temperature steam and to output lower pressure steam to the humidifier/heat exchanger assembly while generating power from the expansion process, wherein the power generated by the expander assembly is output from the fuel cell system or used within the fuel cell system.

8. The fuel cell system in accordance with claim 7, further comprising an air blower for supplying the input oxidant gas to the fuel cell system, wherein the air blower is directly coupled with the expander assembly so that the power generated by the expander assembly is directly used by the air blower.

9. The fuel cell system in accordance with claim 1, wherein the high level heat recovery system provides high level heat to one or more of: a fuel reforming assembly, a refinery coker unit, a heavy oil distillation unit and an expander.

10. A method of generating electrical power and high level heat using a fuel cell system comprising the steps of:
operating at least one high temperature fuel cell stack having an anode side and a cathode side so as to generate electrical power; and
using an exhaust recuperator, cooling the anode exhaust output from the anode side of the at least one high temperature fuel cell stack, and pre-heating an input oxidant gas using at least heat in the anode exhaust,
using a heat exchanger, receiving the pre-heated input oxidant gas from the exhaust recuperator and receiving cathode exhaust from the cathode side of the at least one high temperature fuel cell stack, and further pre-heating the input oxidant gas using heat in the cathode exhaust output from the cathode side of the at least one high temperature fuel cell stack; and
using an anode gas oxidizer of an anode gas oxidizer/high level heat recovery assembly, oxidizing anode gas received from the exhaust recuperator using the input oxidant gas that was pre-heated by both the exhaust recuperator and the heat exchanger, and outputting high temperature oxidant gas at a temperature in a range of 537.8 to 1093.3° C. (1000 to 2000° F.), and
using a high level heat recovery system of the anode gas oxidizer/high level heat recovery assembly, receiving the high temperature oxidant gas from the anode gas oxidizer, recovering high level heat from the high temperature oxidant gas, and outputting high temperature oxidant gas to the cathode side of the at least one high temperature fuel cell stack.

11. The method in accordance with claim 10, wherein the step of recovering high level heat comprises generating high pressure high temperature steam from feed water by directly using the high level heat generated in the oxidizing step.

12. The method in accordance with claim 10, further comprising
recovering water from the anode exhaust to output water-separated anode exhaust, wherein the gas derived from the anode exhaust includes the water-separated anode exhaust.

13. The method in accordance with claim 12, further comprising pre-heating the water-separated anode exhaust using the heat in the anode exhaust while pre-heating the input oxidant gas using the heat in the anode exhaust, and providing the heated water-separated anode exhaust for use in the oxidizing step.

14. The method in accordance with claim 11, further comprising processing input fuel before supplying processed fuel to the at least one high temperature fuel cell stack, the processing step including humidifying the input fuel using one or more of water and a first portion of the high pressure high temperature steam generated in the generating step and pre-heating humidified fuel using waste heat from oxidant exhaust output by the at least one high temperature fuel cell stack.

15. The method in accordance with claim 14, further comprising recovering water from the anode exhaust, outputting recovered water for humidifying the input fuel in the processing step and outputting water-separated anode exhaust for use in the oxidizing step.

16. The method in accordance with claim 14, further comprising expanding a first portion of the high pressure high temperature steam generated in the generating step and outputting lower pressure steam for humidifying the input fuel in the processing step while generating power from the expansion process, wherein the power generated in the expanding step from the expansion process is output for external use or for use within the fuel cell system.

17. The method in accordance with claim 16, further comprising supplying input oxidant gas to the system using a blower, and providing the power generated in the expanding step from the expansion process for direct use by the blower via a direct coupling with the blower.

18. The method in accordance with claim 10, wherein the high temperature oxidant gas provided to the cathode side of the at least one high temperature fuel cell stack has a temperature of about 537.8° C. (1000° F.).

19. The method in accordance with claim 10, wherein the recovering step further comprises providing the high level heat to one or more of: a fuel reforming assembly, a refinery coker unit, a heavy oil distillation unit and an expander.

20. The fuel cell system in accordance with claim 1, further comprising:
a conditioner/cooler configured to recover water from the anode exhaust and to output water-separated anode exhaust,
wherein the exhaust recuperator is structured as a single unit configured to:
receive the anode exhaust output from the anode side of the at least one high temperature fuel cell stack, the water-separated anode exhaust output from the conditioner/cooler, and the input oxidant gas,
exchange heat between (i) the anode exhaust received from the anode side of the at least one high temperature fuel cell stack, and (ii) both the water-separated anode exhaust received from the conditioner/cooler and the input oxidant gas, so as to cool the anode exhaust received from the anode side of the at least one high temperature fuel cell stack, and to pre-heat both the water-separated anode exhaust received from the conditioner/cooler and the input oxidant gas using heat in the anode exhaust,
provide the cooled anode exhaust to the conditioner/cooler, and
provide the pre-heated water-separated anode exhaust and pre-heated input oxidant gas to the oxidizer.

21. The method in accordance with claim 10, further comprising:
using a conditioner/cooler, recovering water from the anode exhaust and to output water-separated anode exhaust,
wherein the exhaust recuperator is structured as a single unit that:
receives the anode exhaust output from the anode side of the at least one high temperature fuel cell stack, the water-separated anode exhaust output from the conditioner/cooler, and the input oxidant gas,
exchanges heat between (i) the anode exhaust received from the anode side of the at least one high temperature fuel cell stack, and (ii) both the water-separated anode exhaust received from the conditioner/cooler and the input oxidant gas, so as to cool the anode exhaust received from the anode side of the at least one high temperature fuel cell stack, and to pre-heat both the water-separated anode exhaust received from the conditioner/cooler and the input oxidant gas using heat in the anode exhaust,
provides the cooled anode exhaust to the conditioner/cooler, and provides the pre-heated water-separated anode exhaust and pre-heated input oxidant gas to the oxidizer.

\* \* \* \* \*